(12) United States Patent
Haefner

(10) Patent No.: US 7,494,441 B2
(45) Date of Patent: Feb. 24, 2009

(54) AUTOMATIC TRANSMISSION SHIFT LEVER ASSEMBLY

(75) Inventor: Marcus Haefner, Lindlar (DE)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 11/326,308

(22) Filed: Jan. 5, 2006

(65) Prior Publication Data

US 2006/0219041 A1    Oct. 5, 2006

(30) Foreign Application Priority Data

Jan. 5, 2005    (EP)  ................................. 05100039

(51) Int. Cl.
*F16H 57/08*    (2006.01)

(52) U.S. Cl. ...................................... 475/331
(58) Field of Classification Search .................. 74/63; 475/331
See application file for complete search history.

(56) References Cited

U.S. PATENT DOCUMENTS

| | | | | |
|---|---|---|---|---|
| 2,522,694 A | * | 9/1950 | Vogel | ............................ 74/498 |
| 3,363,480 A | * | 1/1968 | Murphy | ........................... 475/4 |
| 4,034,835 A | * | 7/1977 | Baba | ............................. 192/98 |
| 4,898,045 A | * | 2/1990 | Baba | ......................... 74/471 R |
| 5,145,469 A | * | 9/1992 | Lasoen | ........................ 475/209 |
| 5,417,126 A | | 5/1995 | DeCrouppe | |
| 5,682,789 A | * | 11/1997 | DeCrouppe et al. | ........... 74/335 |

FOREIGN PATENT DOCUMENTS

EP    0447086    9/1991

\* cited by examiner

*Primary Examiner*—Ha D. Ho
(74) *Attorney, Agent, or Firm*—David B. Kelley; Brooks Kushman P.C.

(57) ABSTRACT

A selector lever arrangement for an automatic transmission of a motor vehicle includes a selector lever which is pivotable about a pivot axis and has the purpose of generating a selector movement. It also includes connecting mechanism for transferring the selector movement to the automatic transmission, and a connecting arrangement for transmitting the selector movement from the selector lever to the connecting mechanism. The connecting arrangement includes a planetary gear mechanism. The selector lever is connected to the input side of the planetary gear mechanism and the connecting mechanism is connected to the output side of the planetary gear mechanism.

16 Claims, 4 Drawing Sheets

AUTOMATIC TRANSMISSION SHIFT LEVER ASSEMBLY

FIELD OF THE INVENTION

The invention relates to selector lever arrangement for automatic transmissions in general and more particularly to a motor vehicle having a selector lever having a planetary gear type connector mechanism.

BACKGROUND OF THE INVENTION

Selector lever arrangements serve to transmit a movement of the selector lever, said movement guided for example by means of a selector gate, to an input element of the automatic transmission. Since the automatic transmission is arranged remotely from the selector lever arranged in the driving compartment, the movement is transmitted by connecting means. It is advantageous in this context if the selector movement is not reversed by the transmission to the connecting means, since, as is common in transverse automatic transmissions, the connecting means have, over at least one section, a Bowden cable which by means of its tension wire allows a smooth redirection of tensile loads generated by the movement. In this context, it is simultaneously necessary that in the installation position, the connecting means are guided out of the passenger compartment at a certain level at which neither assemblies, particularly heating assemblies, arranged between a passenger compartment and a motor space are located nor at which the connecting means need be disadvantageously guided through the vehicle floor. This requires that the design size of the selector lever arrangement must be as compact as possible, especially since in addition a relatively small installation space for the selector lever arrangement may be provided in newer vehicles.

It is therefore an object of the invention to provide a selector lever arrangement of the type mentioned in the introduction which is of compact design, whose connecting means may be arranged at a desired height in the installation position and which avoids a reversal of the selector movement of the selector lever.

According to the invention, the set object is achieved in that the connecting arrangement has a planetary gear mechanism, the selector lever being connected to the input side of the planetary gear mechanism and the connecting means being connected to the output side of the planetary gear mechanism.

A planetary gear mechanism may on account of its specific design have a particularly compact shape so that the selector lever arrangement may be given a correspondingly compact design. It is thus possible, in the installation position of the selector lever arrangement in a vehicle, to guide the connecting means to the gear mechanism at a desired height so that other components, particularly heating units, do not form a restraint nor is a lead-through through the vehicle floor necessary. In addition, as described later, it is possible to avoid the need to reverse the direction of the selector movement corresponding to the set object in its transmission to the connecting means.

An embodiment is preferred in which the planetary gear mechanism has gear mechanism elements in the form of an internal gear having inner tooth gearing or ring gear, at least one planet gear arranged on a planet carrier, and a sun gear. In the embodiment of a gear mechanism element as an outwardly located internal gear, the internal gear and the sun gear are arranged concentrically with the sun gear on the inside and the internal gear on the outside, so that the rotational axes of the internal gear and the sun gear coincide. The planet gears are arranged rotatably on the planet carrier with a rotational axis preferably parallel to the rotational axes of the internal gear and the sun gear and arranged kinematically and in terms of position between the internal gear and the sun gear, and between the gear rims of the internal gear and the sun gear, respectively. In this way, a particularly simple, robust and simultaneously compact embodiment of the planetary gear mechanism is proposed.

The connecting means preferably engage circumferentially and in an approximately tangential engagement direction on that gear mechanism element which is designed as an output side. In this way, the greatest possible selector path, which can be transmitted by connecting means, is generated with the transmission from the gear mechanism element designed as an output side to the connecting means. The selector path is in this case dependent on the cosine of the angle between the engagement direction and the radius to the circumferential engagement point at which the connection means engage on the gear mechanism element designed as an output side. Relative to the rotational axis of the gear mechanism element designed as an output side, the engagement point is preferably on that side of the gear mechanism element designed as an output side which faces away from the selector lever and is thus arranged on the underside of the planetary gear mechanism in the installation position of the selector lever arrangement in a vehicle.

In general, the planetary gear mechanism is a gear mechanism with three shafts, two of which are implemented as inputs and one as an output, one of which is implemented as an input and two as outputs, or one of which is implemented as an input, one is fixed relative to a base and one is implemented as an output. In this case, the last described version having one input shaft, one shaft fixed relative to a base and one output shaft is preferred since this gives complete transmission of torque. In this case, an embodiment is preferred in which the planet carrier is connected in a rotationally fixed manner to a base. With the rotationally fixed planet carrier, the spatial arrangement of the planet gears relative to the base, preferably relative to a gear mechanism housing of the planetary gear mechanism, is fixed and complete transmission of torque is possible by means of the planet gears from the sun gear to the internal gear or, conversely, by means of the planet gears from the internal gear to the sun gear, which transmission of torque brings with it a simplification, described later, in the design of the selector lever arrangement.

In a preferred development, the rotational axes of the sun gear and of the internal gear coincide with the pivot axis of the selector lever. Since the pivot axis of the selector lever is the same as the central rotational axes of the sun gear and internal gear and is thus positioned in the centre of the sun gear mechanism, the selector lever may engage directly on the input side of the planetary gear mechanism on the sun gear or on the internal gear, without further transmission means and pivoting and with a large lever length necessary for comfortable execution of the selector movement and thus with a correspondingly large lever force. In this way, the selector lever length which projects above the gear mechanism may be correspondingly reduced, which may additionally contribute to the compact design of the selector lever arrangement.

The internal gear is preferably connected, as an input side of the planetary gear mechanism, in a rotationally fixed manner to the selector lever, while the sun gear is connected, as an output side of the planetary gear mechanism, in a positive and/or non-positive manner to the connecting means. In addition, if in one preferred embodiment the planet carrier is connected in a rotationally fixed manner to the base, the selector movement transmitted to the internal gear is completely transmitted to the sun gear via the planet gear and reversed in direction. In this case, the selector lever preferably engages on the outer side of the internal gear, as a result of which the greatest possible lever for transmitting the selector movement from the selector lever to the internal gear is obtained. The selector lever and internal gear may in this case be embodied in one piece. The selector lever may also engage on the end side of the internal gear.

In another embodiment, conversely to the previously described embodiment, the sun gear may be connected, as an input side of the planetary gear mechanism, in a rotationally fixed manner to the selector lever, while the internal gear is connected to the connecting means, as an input side of the planetary gear mechanism, in a positive and/or non-positive manner. In this case, the selector lever may in the same way engage on an end side of the sun gear, the selector lever preferably engaging on as radially outward a point as possible on the sun gear in order to obtain as large a lever arm as possible for transmitting the force exerted on the sun gear by means of the selector lever. The sun gear and selector lever may also be produced in one piece.

In a preferred development of the selector lever arrangement, the internal gear is designed as a gear segment. The compact shape of the selector lever arrangement, particularly of the planetary gear mechanism, is further enhanced by means of the reduction of the internal gear to a gear segment. The required size of the gear segments depends on the size of the pivoting movement of the lever. If the pivoting movement is transmitted from the sun gear or from the internal gear with a ratio of 1:1 to the internal gear or to the sun gear respectively, pivoting movements of the selector lever and gear segment must correspond to at least one common circle centre angle. In order to ensure secure mutual engagement of the gear segment and sun gear in this case, the circle centre angle of the gear segment should be designed to be slightly larger than that of the pivoting movement of the selector lever.

The gear segment of the internal gear is preferably arranged laterally relative to the longitudinal extent of the selector lever. As a result it is possible to reduce the dimensioning of the planetary gear mechanism in the longitudinal direction and in the direction of the engagement force of the selector lever and thus to make the selector lever arrangement more compact.

In a likewise preferred embodiment of the selector lever arrangement, the sun gear is designed as a gear segment. In this case, as in the embodiment of the internal gear as a gear segment, the required size of the gear segment is particularly dependent on the size of the circle centre angle of the pivoting movement of the selector lever.

In one advantageous development, both gear mechanism elements, the sun gear and the internal gear, may be designed as gear segments. In this case, an embodiment is preferred in which the selector lever engages on the gear segment of the sun gear on the input side while the internal gear engages on the connecting means on the output side. In this case, both gear mechanism elements, the sun gear and the internal gear, may be arranged relative to the pivot axis on that side of the planetary gear mechanism facing away from the selector lever, that is to say, in the installation position of the selector lever arrangement in a vehicle, on the lower side of the planetary gear mechanism, to which the connecting means preferably also lead. In another embodiment, the selector lever may engage on the gear segment of the internal gear on the input side while the gear segment of the sun gear is connected to the connecting means on the output side.

In one preferred development, the planetary gear mechanism may have a single planet gear. This embodiment is particularly appropriate if the internal gear and/or the sun gear are designed as gear segments, the single planet gear being respectively arranged between the segments or between the segment and the gear mechanism element which is not designed as a segment. As a result, the planetary gear mechanism is simplified and its compact embodiment further enhanced.

To connect the connecting means to the input side of the planetary gear mechanism, extension elements may be provided which extend from the input side to the engagement point. The extension elements are preferably connected in a rotationally fixed manner to the input side of the planetary gear mechanism. These extension elements may be designed, for example, to produce a desired lever arm, that is to say a distance between the pivot axis and the engagement point. Furthermore, the extension elements may extend from a gear mechanism element—which is embodied as an output side, is designed as a gear segment and relative to the selector lever is arranged laterally in the planetary gear mechanism—to the engagement point, the engagement point described above being advantageously arranged relative to the pivot axis on that side of the planetary gear mechanism facing away from the selector lever, that is to say, in the installation position, on the lower side of the planetary gear mechanism, in order to transmit the rotational selector movement generated by the pivoting of the selector lever as completely as possible to connecting means with linear movement, for example to a Bowden cable.

In order to transfer the selector movement, the connecting means may engage on the planetary gear mechanism by means of a Bowden cable. A Bowden cable has an inner tension wire or the like and an outer tube. In this case, the tube may be fastened to the base while one end of the wire projecting beyond the tube may be circumferentially wound onto the gear mechanism element which is designed as an output guide. A rod may however also be provided instead of a Bowden cable, which rod may be used particularly in the case of a longitudinally arranged automatic transmission.

BRIEF DESCRIPTION OF THE DRAWINGS

The present invention is explained in the following with reference to a plurality of exemplary embodiments illustrated in a drawing. In the drawing, in each case in a highly schematized design sketch which clarifies the fundamental principle.

DETAILED DESCRIPTION

Figure 1:
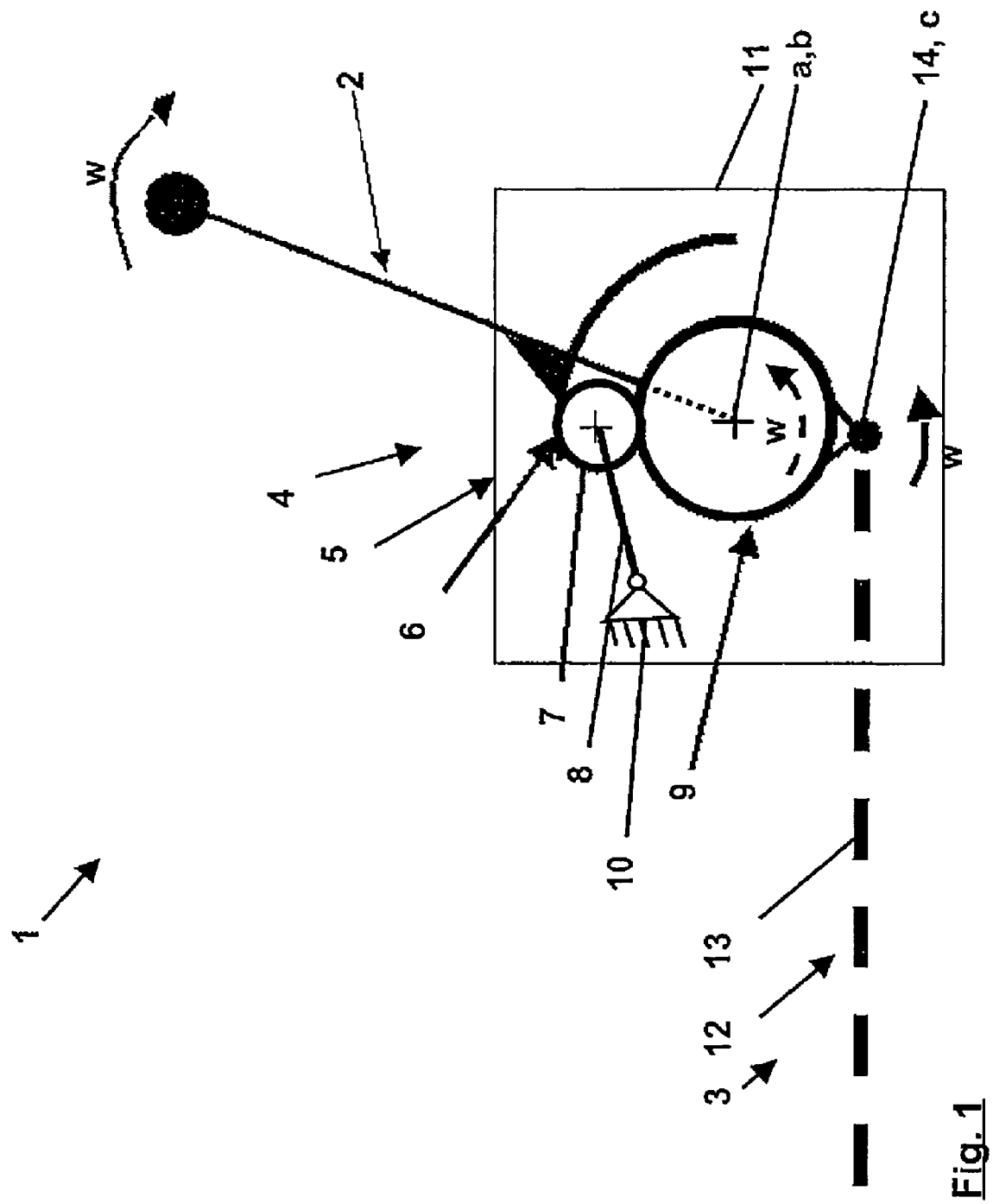
FIG. 1 shows a schematic side view of a first exemplary embodiment of a selector lever arrangement according to the present invention.

Each of FIGS. 1 to 4 shows a different selector lever arrangement in a side view and in a highly schematized illustration outlining the fundamental principle. The four different selector lever arrangements 1, illustrated in FIGS. 1 to 4, for an automatic transmission (not illustrated) of a motor vehicle (not illustrated), each have a selector lever 2, which is pivotable about a pivot axis a, for generating a selector movement w, connecting means 3 for transferring the selector movement to the automatic transmission and a connecting arrangement 4 for transmitting the selector movement w from the selector lever 2 to the connecting means 3. The connecting arrangement 4 is provided with a planetary gear mechanism 5, the selector lever 2 being connected to the input side of the planetary gear mechanism 5 and the connecting means 3 being connected to the output side of the planetary gear mechanism 5. The planetary gear mechanisms 5 have gear mechanism elements in the form of an internal gear 6 having inner tooth gearing, a planet gear 7 which is rotatably arranged on a planet carrier 8 illustrated symbolically here, and a sun gear 9. The planet carrier 8 is connected to a base 10 represented here only in symbolic form, it being possible for example for the base 10 to be the gear mechanism housing of the planetary gear mechanism.

The rotational axes b of the sun gear 9 and of the internal gear 6 coincide with the pivot axis a of the selector lever 2, the pivot axis a and rotational axes b being perpendicular to the drawing plane in the drawing. The selector movement w transmitted by pivoting the selector lever 2 about its pivot axis a to the sun gear 9 or to the internal gear 6 is completely transmitted further to the internal gear 6 or respectively to the sun gear 9 by means of the fixed connection between the planet carrier 8 and the base 10, the selector movement w experiencing a reversal of direction by each of the pivot axis a and the planet gear 7 and thus experiencing overall a twofold reversal of direction, so that overall the direction of the selector movement relative to the longitudinal progression shown in FIGS. 1 to 4 of the connection means 3 within a certain degree of pivoting of the selector lever 2 about its pivot axis a remains approximately unchanged. The use of a planetary gear mechanism 5 is conducive to a required compact design of the selector lever arrangement 1. As described in more detail later in the description of the four embodiments of the selector lever arrangement 1, the planet gear 7 and/or the sun gear 9 are/is designed as gear segments/a gear segment, as a result of which the possibility of obtaining a compact design of the selector lever arrangement 1 is enhanced. In this case, the required size of the respective gear segment is dependent on the size of the pivoting movement w of the selector lever 2. That is to say the pivoting movement w and the respective gear segment must correspond to at least one common circle centre angle. In order to ensure secure mutual engagement of the gear segment and the respective other gear mechanism element, the inner gear 6 or the sun gear 9, or secure mutual engagement of the gear segments, the circle centre angle of the respective gear segment or of the gear segments should be at least slightly larger than that of the pivoting movement w of the selector lever 2. At the same time, as a result of the use of at least one gear segment it is also the case that only a single planet gear 7 is required to transmit the selector movement w, as a result of which the compact design of the selector lever arrangement 1 is further enhanced.

The connection means 3 in all four embodiments of the selector lever arrangement 1 engage relative to the pivot axis a of the selector lever 2 on that side of the planetary gear mechanism 5 facing away from the selector lever 2, that is to say, in the installation position of the planetary gear mechanism 5 represented approximately in FIGS. 1 to 4, on the lower side of the planetary gear mechanism 5. As a result, the pivoting movement of the selector lever 2 about the pivot axis a has a maximum travel component in the longitudinal extent of the connecting means 3 so that as great a transmission of the selector movement w to the connecting means 3 as possible is ensured. The connecting means 3 shown schematically here engage circumferentially in their longitudinal extent shown here and in an approximately tangential direction on the gear mechanism element designed as an output side. The connecting means 3 have here a Bowden cable 12 whose tension wire 11 engages on the lower side of the output side gear mechanism element 9 of the planetary gear mechanism 5, of the sun gear 9 or of the internal gear 6. As not explicitly illustrated here, the Bowden cable 12 has an outer tube and the like in which the tension cable 11 is displaceably mounted, the tube being fastened relative to the base 10 and it being possible for that end of the tension wire 13 which is illustrated here and which projects beyond the tube to be wound circumferentially onto the sun gear 9. For this purpose, the sun gear has an at least partially circumferential groove into which the tension wire can be wound. The tension wire 13 is connected by connecting means 14 to the sun gear 9 or to the internal gear 6 and mounted so as to pivot about a tension wire pivot axis c, which runs parallel to the pivot axes a and the rotational axis b.

Figure 2:
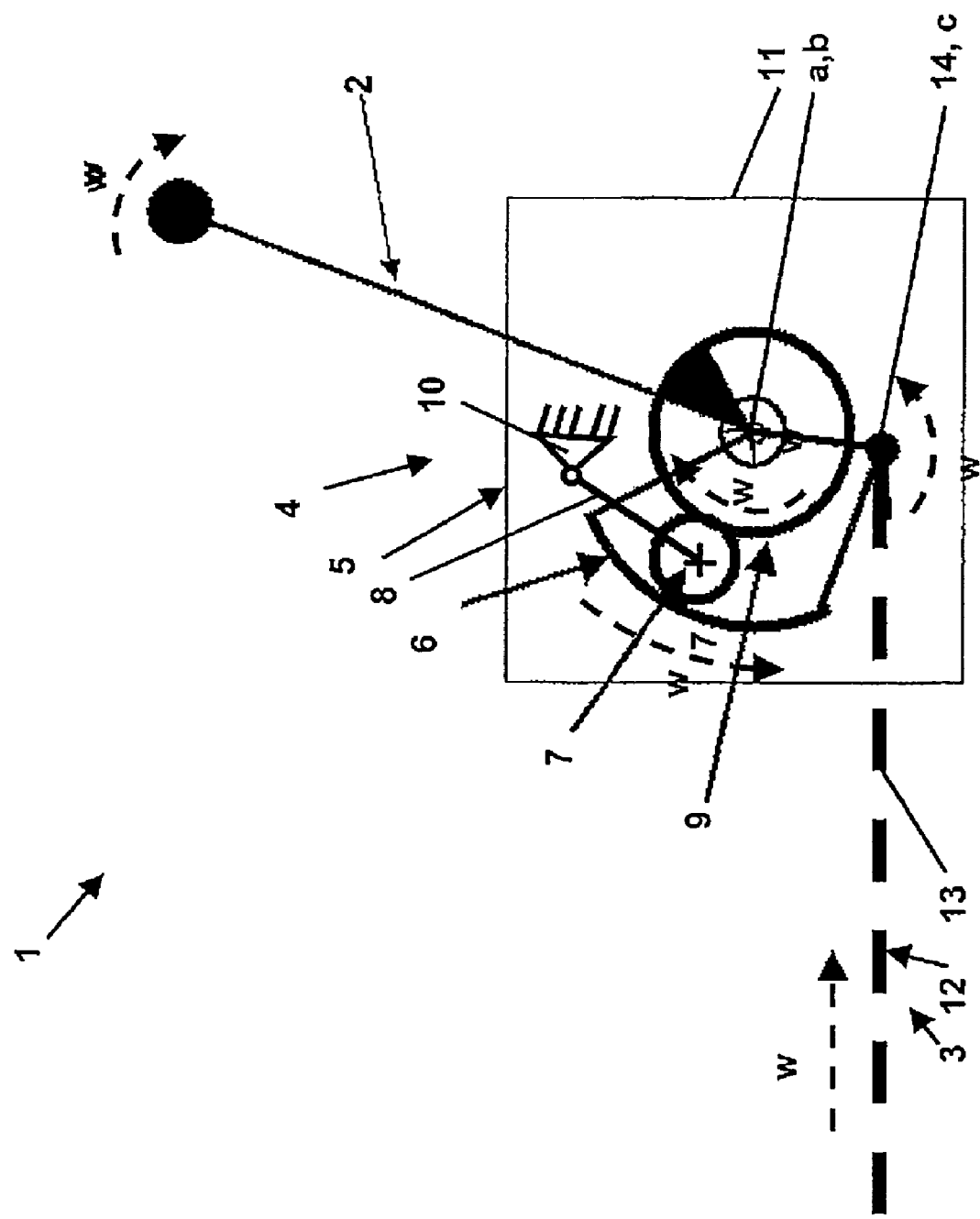
FIG. 2 shows a schematic side view of a second exemplary embodiment of a selector lever arrangement according to the present invention.

A side view of a first embodiment of the selector lever arrangement 1 is shown schematically in FIG. 1. In this case, the internal gear 6 is connected, as an input side of the planetary gear mechanism 5, in a rotationally fixed manner to the selector lever 2, while the sun gear 9 is connected, as an output side of the planetary gear mechanism 5, to the connecting means 3 in a positive and/or non-positive manner. In this case, the selector lever 2 engages directly on the outside of the internal gear 6, so that the pivot axis a of the selector lever 2 and the rotational axis b of the internal gear 6 are identical, as indicated in the figure by means of the dashed line leading to the centre of the internal gear 6. The border drawn around the planetary gear mechanism 5 in both of FIGS. 1 and 2 is intended to symbolize a reduced installation space 11 for the planetary gear mechanism 5, in which it is to be possible to install the planetary gear mechanism 5. The internal gear 6 is designed here as a gear segment.

FIG. 2 shows a second embodiment of the selector lever arrangement 1 in which the sun gear 9 is connected, as an input side of the planetary gear mechanism 5, in a rotationally fixed manner to the selector lever 2, while the internal gear 6 is connected, as an output side of the planetary gear mechanism 5, in a positive and/or non-positive manner to the connecting means 3. The internal gear 6 is designed as a gear segment which, in order to reduce the maximum height of the planetary gear mechanism 5, is arranged laterally with respect to the sun gear 9 in the installation position. However, in order to achieve maximum transmission of the selector movement w to the connecting means 3, extension elements 15 are provided which extend from the gear segment of the internal gear 6 to that side of the planetary gear mechanism 5 facing away from the selector lever 2, that is to say to the lower side of the planetary gear mechanism 5 in the installation position and to an engagement point situated radially further inward.

Figure 3:
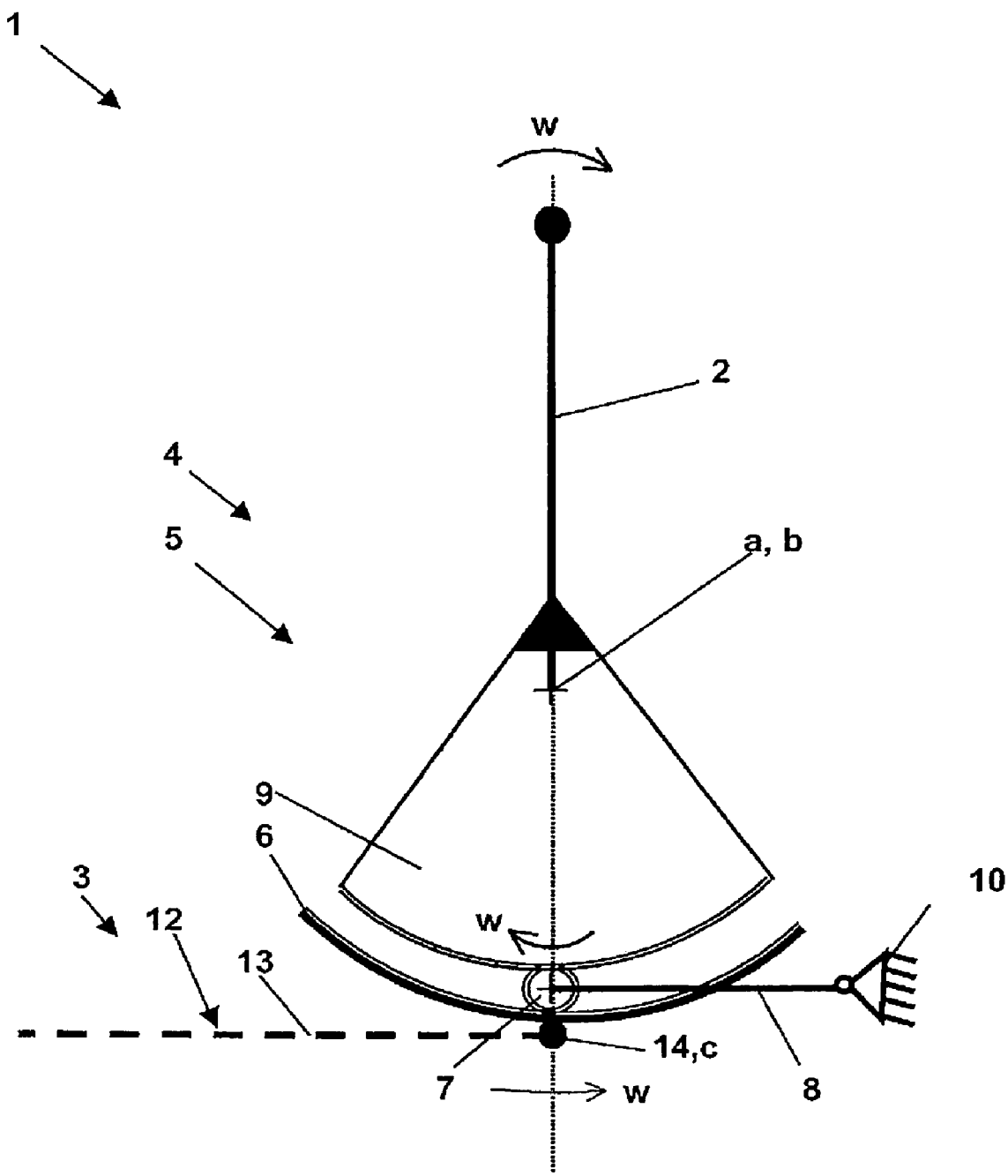
FIG. 3 shows a schematic side view of a third exemplary embodiment of a selector lever arrangement according to the present invention and FIG. 4 shows a schematic side view of a fourth exemplary embodiment of a selector lever arrangement of the preferred embodiments.

FIG. 3 shows a third embodiment of the selector lever arrangement 1. In this case, the internal gear 6 and the sun gear 9 are designed as gear segments, the sun gear 9 being connected, as an input side of the planetary gear mechanism 5, to the selector lever 2 in a rotationally fixed manner, while the internal gear 6 is connected, as an output side of the planetary gear mechanism 5, in a positive and/or non-positive manner to the connecting means 3. In this case, both gear segments are arranged on the underside of the planetary gear mechanism 5 so that the connecting means 3 can directly engage on the planet gear 7 on the lower side. A further reduction in the overall size of the planetary gear mechanism 5 is possible by means of the design of both gear mechanism elements, of the internal gear 6 and of the sun gear 9.

Figure 4:
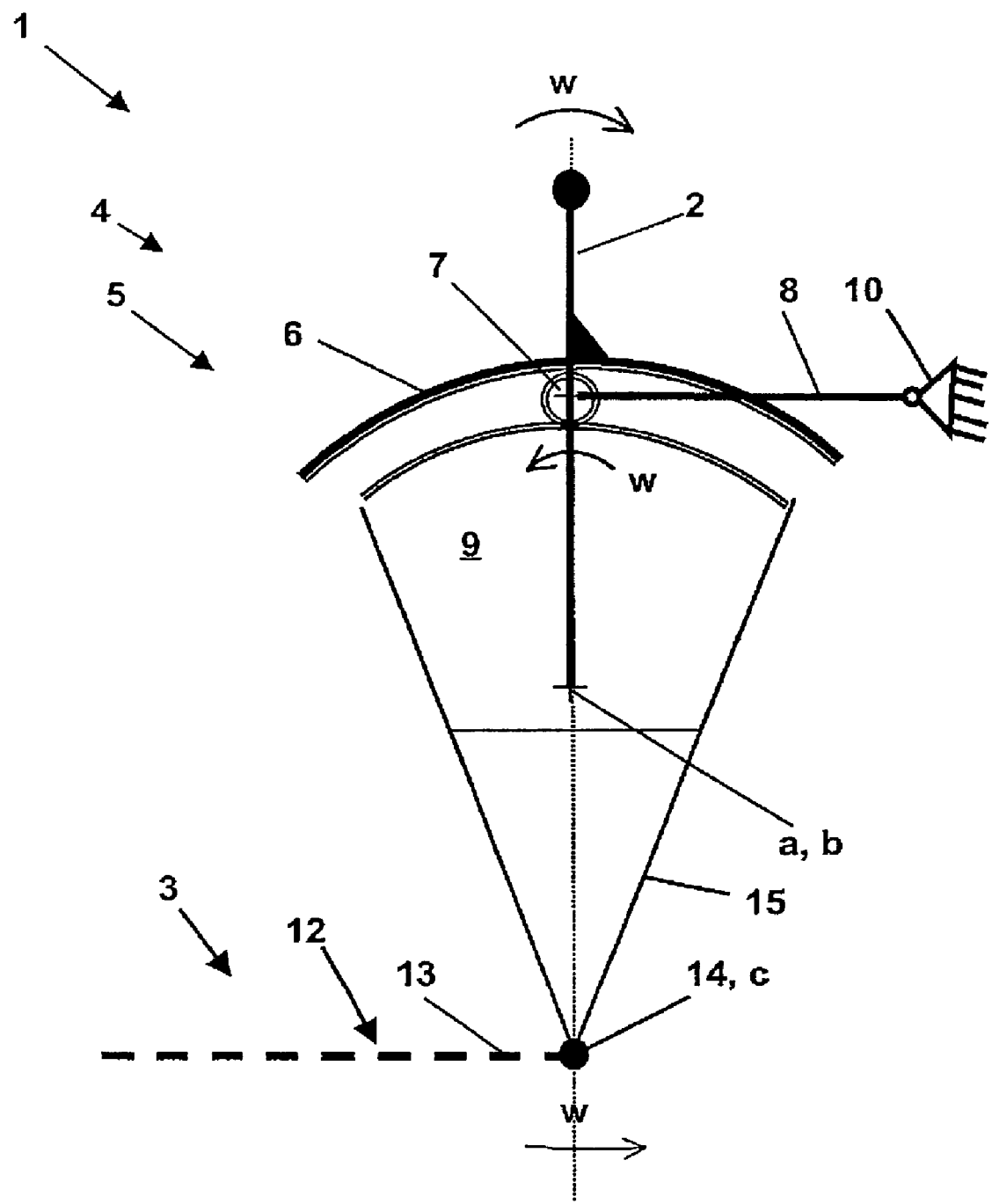

FIG. 4 represents a fourth embodiment of the selector lever arrangement 1 in which, as in the third embodiment of the selector lever arrangement 1, the internal gear 6 and sun gear 9 are designed as gear segments. In this case, however, the internal gear 6 is connected, as an input side of the planetary gear mechanism 5, in a rotationally fixed manner to the selector lever 2, while the sun gear 9 is connected, as an output side of the planetary gear mechanism 5, in a positive and/or non-positive manner to the connecting means 3. In this case, additional extension elements 15 are provided which extend further to the underside of the planetary gear mechanism 5 in order to produce a desired lever between the pivot axis a or the rotational axis b and the engagement region of the connecting means 3.

REFERENCE SYMBOL LIST

1. Selector lever arrangement
2. Selector lever
3. Connecting means
4. Connecting arrangement
5. Planetary gear mechanism
6. Internal gear
7. Planet gear
8. Planet carrier
9. Sun gear
10. Base
11. Installation space
12. Bowden cable
13. Tension wire
14. Fastening means
15. Extension element
a Pivot axis
b Rotational axis
c Tension wire pivot axis
w Selector movement

The invention claimed is:

1. A selector lever arrangement for an automatic transmission of a motor vehicle comprising:
    a selector lever which is pivotable about a pivot axis and has the purpose of generating a selector movement;
    connecting means for transferring the selector movement to the automatic transmission; and
    a connecting arrangement for transmitting the selector movement from the selector lever to the connecting means, the connecting arrangement including a planetary gear mechanism, the selector lever being connected to an input side of the planetary gear mechanism and the connecting means being connected to an output side of the planetary gear mechanism, the connecting means engaging circumferentially in an approximately tangential engagement direction to the output side of the planetary gear mechanism.

2. The selector lever arrangement as claimed in claim 1, wherein the planetary gear mechanism has gear mechanism elements in the form of an internal gear having inner tooth gearing, at least one planet gear on a planet carrier, and a sun gear.

3. The selector lever arrangement as claimed in claim 2 wherein the planet carrier is connected to a base in a rotationally fixed manner.

4. The selector lever arrangement as claimed in claim 2 wherein the rotational axes of the sun gear and of the internal gear coincide with the pivot axis of the selector lever.

5. The selector lever arrangement as claimed in claim 2 wherein the internal gear is connected, on the input side of the planetary gear mechanism, in a rotationally fixed manner to the selector lever, while the sun gear is connected, on the output side of the planetary gear mechanism, to the connecting means.

6. The selector lever arrangement as claimed in claim 5, wherein the selector lever engages on the outer side of the internal gear.

7. The selector lever arrangement as claimed in claim 2 wherein the internal gear is designed as a gear segment.

8. The selector lever arrangement as claimed in claim 2 wherein the planetary gear mechanism has a single planet gear.

9. The selector lever arrangement as claimed in claim 1 wherein in order to transfer the selector movement, the connecting means engage on the output side of the planetary gear mechanism by means of a Bowden cable.

10. A selector lever arrangement for a motor vehicle having connecting means for transferring selector movement to an automatic transmission, the arrangement comprising:
    a selector lever which is pivotable about a pivot axis to of generate a selector movement; and
    a connecting arrangement including a planetary gear mechanism having an internal gear having inner tooth gearing, at least one planet gear on a planet carrier connected to a base in a rotationally fixed manner, and a sun gear, the selector lever being connected to an input side of the planetary gear mechanism and the connecting means being connected on an output side of the planetary gear mechanism to the automatic transmission.

11. The selector lever arrangement as claimed in claim 10 wherein the rotational axes of the sun gear and of the internal gear coincide with the pivot axis of the selector lever.

12. The selector lever arrangement as claimed in claim 10, wherein the internal gear is connected in a rotationally fixed manner to the selector lever on the input side of the planetary gear mechanism, and the sun gear is connected to the connecting means on the output side of the planetary gear mechanism.

13. A selector lever arrangement for an automatic transmission of a motor vehicle comprising:
    a selector lever which is pivotable about a pivot axis and operable to generate a selector movement;
    connecting means for linearly transferring the selector movement to the automatic transmission; and
    a connecting arrangement for transmitting the selector movement from the selector lever to the connecting means, the connecting arrangement including a planetary gear mechanism having a rotationally fixed planet carrier, the selector lever being connected to an input side of the planetary gear mechanism and the connecting means being connected to an output side of the planetary gear mechanism.

14. The selector lever arrangement as claimed in claim 13, wherein the connecting means includes at least one of a Bowden cable or a rod to effect the linear transfer of the selector movement to the automatic transmission.

15. The selector lever arrangement as claimed in claim 13, wherein the planetary gear mechanism includes an internal gear having inner tooth gearing, at least one planet gear on the planet carrier connected to a base in a rotationally fixed manner, and a sun gear.

16. The selector lever arrangement as claimed in claim 15, wherein the internal gear is connected in a rotationally fixed manner to the selector lever on the input side of the planetary gear mechanism, and the sun gear is connected to the connecting means on the output side of the planetary gear mechanism.

* * * * *